(12) United States Patent
Alapati et al.

(10) Patent No.: US 9,753,776 B2
(45) Date of Patent: Sep. 5, 2017

(54) SIMULTANEOUS MULTITHREADING RESOURCE SHARING

(71) Applicant: International Business Machines Corporation, Armonk, NY (US)

(72) Inventors: Sangram Alapati, Austin, TX (US); Puneeth A. Bhat, Bangalore (IN); Satish K. Sadasivam, Erode (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 14/955,428

(22) Filed: Dec. 1, 2015

(65) Prior Publication Data

US 2017/0153922 A1  Jun. 1, 2017

(51) Int. Cl.
G06F 9/46 (2006.01)
G06F 9/50 (2006.01)
G06F 9/30 (2006.01)

(52) U.S. Cl.
CPC .......... *G06F 9/5027* (2013.01); *G06F 9/3013* (2013.01); *G06F 9/30032* (2013.01)

(58) Field of Classification Search
None
See application file for complete search history.

(56) References Cited

U.S. PATENT DOCUMENTS

| | | | |
|---|---|---|---|
| 8,458,709 B2 | 6/2013 | Armstrong et al. | |
| 8,640,109 B2 | 1/2014 | Bellows et al. | |
| 2004/0215932 A1* | 10/2004 | Burky | G06F 9/485 712/43 |
| 2004/0216101 A1* | 10/2004 | Burky | G06F 9/485 718/100 |
| 2007/0300227 A1* | 12/2007 | Mall | G06F 9/3851 718/102 |
| 2009/0307698 A1* | 12/2009 | Khatri | G06F 1/3203 718/102 |
| 2010/0095306 A1* | 4/2010 | Gomyo | G06F 9/30083 718/107 |
| 2010/0162041 A1* | 6/2010 | El-Shishiny | G06F 9/4881 714/10 |
| 2011/0276787 A1* | 11/2011 | Koga | G06F 8/45 712/215 |
| 2013/0086365 A1* | 4/2013 | Gschwind | G06F 9/30072 712/220 |
| 2013/0124826 A1* | 5/2013 | Merchant | G06F 9/3851 712/205 |
| 2013/0246761 A1* | 9/2013 | Derby | G06F 9/30098 712/225 |

(Continued)

*Primary Examiner* — Dong Kim
(74) *Attorney, Agent, or Firm* — Robert J. Shatto (57) ABSTRACT

A computer system may determine a mode for a processor. The processor may support SMT, and it may have a first hardware thread with a first architected resource and a second hardware thread with a second architected resource. The computer system may determine that the processor is in a reduced-thread mode. The computer system may determine that the first hardware thread is a primary hardware thread that is active in the reduced-thread mode, and that the second hardware thread is a secondary hardware thread that is inactive in the reduced-thread mode. The computer system may disable the second hardware thread. The computer system may enable the first hardware thread to access the second architected resources.

20 Claims, 6 Drawing Sheets

(56) References Cited

U.S. PATENT DOCUMENTS

| | | | |
|---|---|---|---|
| 2013/0268942 A1* | 10/2013 | Duluk, Jr. | G06F 9/4881 718/104 |
| 2014/0122844 A1* | 5/2014 | Swanberg | G06F 9/3012 712/228 |
| 2014/0173619 A1* | 6/2014 | Nakashima | G06F 9/4893 718/104 |
| 2015/0277867 A1* | 10/2015 | Hasabnis | G06F 8/433 717/164 |

* cited by examiner

SIMULTANEOUS MULTITHREADING RESOURCE SHARING

BACKGROUND

The present disclosure relates generally to the field of computer hardware, and more particularly to enabling simultaneous multithreading (SMT) resource sharing in reduced-thread modes.

SMT is a technique for improving the efficiency of computer processor using hardware multithreading by exploiting thread-level parallelism. SMT permits multiple independent execution threads to better utilize shared resources such as cache, buffers, queues, and execution units. In addition to the shared resources, each hardware thread in a processor that supports SMT has its own architected resources, including one or more sets of registers.

SUMMARY

Embodiments of the present disclosure include a method and a system for using simultaneous multithreading (SMT) architected resources in a reduced-thread mode. A computer system may determine a mode for a processor. The processor may support SMT, and it may have a first hardware thread with a first architected resource and a second hardware thread with a second architected resource. The computer system may determine that the processor is in a reduced-thread mode. The computer system may determine that the first hardware thread is a primary hardware thread that is active in the reduced-thread mode, and that the second hardware thread is a secondary hardware thread that is inactive in the reduced-thread mode. The computer system may disable the second hardware thread. The computer system may enable the first hardware thread to access the second architected resources.

Additional embodiments of the present disclosure include a method for loading an application in a reduced-thread mode. A computer system may identify an application to be loaded. The application may have a binary configured to be executed by a processor in a reduced-thread mode. The processor may support SMT, and it may have a first hardware thread with a first architected resource and a second hardware thread with a second architected resource. The first hardware thread may be a primary hardware thread, and the second hardware thread may be a secondary hardware thread. The second hardware thread may be associated with the first hardware thread such that the first hardware thread can access the secondary architected resource. The computer system may determine whether the operating system is in the reduced-thread mode and, if so, load the application.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer hardware, and in particular to enabling simultaneous multithreading (SMT) resource sharing in reduced-thread modes. While the present disclosure is not necessarily limited to such applications, various aspects of the disclosure may be appreciated through a discussion of various examples using this context.

Each hardware thread in a processor that supports multi-threading (such as SMT) has its own set of architected resources. The architected resources may include one or more sets of registers, such as general purpose registers and/or vector/scalar registers. These registers may be used by the hardware threads when executing parts of an application in parallel. The use of registers allows hardware threads to simultaneously perform operations on data without interfering with other hardware threads working with the same data.

There are several modes in which an SMT processor may be run. First, the SMT processor may be run in a full SMT mode, where all hardware threads are enabled and active. The SMT processor may also be run in a reduced-SMT mode, where not all hardware threads are active. For example, an SMT-4 processor (e.g., a processor that supports four hardware threads per core) may be run in SMT-2 mode (only two of the four hardware threads are active). Alternatively, an SMT processor may be run in a single-thread (ST)

mode, where only a single hardware thread may be active. Regardless of whether the processor is running in a reduced-SMT mode or ST mode, each hardware thread may only access its own architected resources.

Some applications do not benefit from a processor having additional hardware threads, and are therefore unable to exploit the thread level parallelism provided by SMT. For example, an application may require a number of operations to be performed in a sequence (e.g., serially) instead of in parallel. The application may, however, benefit from having a larger set of registers to use.

Accordingly, the present disclosure introduces two new processor modes for an SMT processor: an extended-ST mode and an enhanced extended-ST mode. The extended-ST mode and enhanced extended-ST mode are collectively referred to herein as reduced-thread modes. In the extended-ST mode, the hardware threads may be paired up such that half of the hardware threads are primary hardware threads and the other half of the hardware threads are secondary hardware threads. Each primary hardware thread may have an associated secondary hardware thread. The primary hardware threads may be active (e.g., operational) while the secondary hardware threads may be disabled. Accordingly, no more than half of the hardware threads (e.g., two of the four hardware threads supported by SMT-4 processors) may be active in the extended-ST mode.

Each primary hardware thread may access the architected resources of its associated secondary hardware thread, referred to as a secondary architected resource. The primary hardware thread may use a specific move instruction introduced in the present disclosure to move the contents stored in its secondary architected resource to its own architected resource (also referred to as its primary architected resource), and vice versa. The move instruction may be part of the instruction set architecture (ISA) for the SMT processor. The move instruction may indicate the source register (e.g., the register from which data will be moved) and the target register, also known as the destination register (e.g., the register to which the data will be moved). Although shown and discussed herein as an R-format instruction, those skilled in the art will readily appreciate a variety of formats that may be used for the move instruction.

The second new processor mode disclosed herein is referred to as the enhanced extended-ST mode. In the enhanced extended-ST mode, a primary hardware thread may have more than one associated secondary hardware threads. Accordingly, each primary hardware thread may have access to multiple secondary architected resources. For example, a first hardware thread of an SMT-4 processor core may be a primary hardware thread. The second, third, and fourth hardware threads of the same SMT-4 processor core may be secondary hardware threads associated with the first hardware thread. The second, third, and fourth hardware threads may be disabled when the processor is running in the enhanced extended-ST mode, and the first hardware thread may be able to access all three secondary architected resources using a new move instruction Like the move instruction used in extended-ST mode, the move instruction for the enhanced extended-ST mode may indicate the source and target registers. Additionally, the move instruction may indicate a thread ID (TTID) that specifies which secondary architected resource is being utilized by the primary hardware thread.

The move instructions disclosed herein may be necessary because the other instructions in the ISA may not allow, and may not be modifiable to allow, an application running on a hardware thread to perform operations directly on the secondary architected resources. For example, an application executing on a primary hardware thread may not be able to directly perform an arithmetic operation on data stored in a secondary architected resource. As such, the application may need to use the move instruction to first move the data to a primary architected resource before performing the arithmetic operation on the data.

In order to make use of the two new processor modes disclosed herein, an application may need to be compiled using an application binary interface (ABI) specification that dictates how to use the move instructions to transfer data between registers residing in the architected resources of different hardware threads. A computer system may receive an application to be compiled and an ABI specification. The ABI specification may instruct the compiler how to use the available primary and secondary architected resources. The computer system may determine that the application is to be executed in a reduced-thread mode, such as the extended-ST mode and the enhanced extended-ST mode. The computer system may then compile the application to generate a binary file for the application. The computer system may compile the application using the guidelines established by the ABI specification so that the application can make use of secondary architected resources.

A user (or function/other application) may request that the computer system execute the compiled binary file for the application. The computer system may determine whether the operating system (and, therefore, processor) is in the correct mode to execute the application. If the operating system is not in the correct mode, the computer system may report an error and terminate the application. If the operating system is in the correct mode, the computer system may load and execute the application.

In some embodiments, a binary compiled for execution in a reduced-thread mode (e.g., the extended-ST mode) may not be executable in a standard processor mode. This may be because the application may expect to be able to store data in, and move data from, secondary architected resources, which does not work in standard processor modes. Likewise, a binary compiled for execution in a specific reduced-thread mode (e.g., the enhanced extended-ST mode) may not be executable in the other reduced-thread mode (e.g., the extended-ST mode) due to differences in the move commands used to move data from secondary architected resources to primary architected resources.

In some embodiments, a binary compiled to run with a lower number of architected resources may be executable in other modes that have more architected resources. For example, in some embodiments, a binary compiled to run in the extended-ST mode may be executable in the enhanced extended-ST mode, though the application may only be able to utilize a single set of secondary architected resources. Likewise, in some embodiments, a binary compiled for execution in a standard processor mode may be executable in a reduced thread mode (e.g., the extended-ST mode), though the application may not be able to utilize the secondary architected resources.

Figure 1:
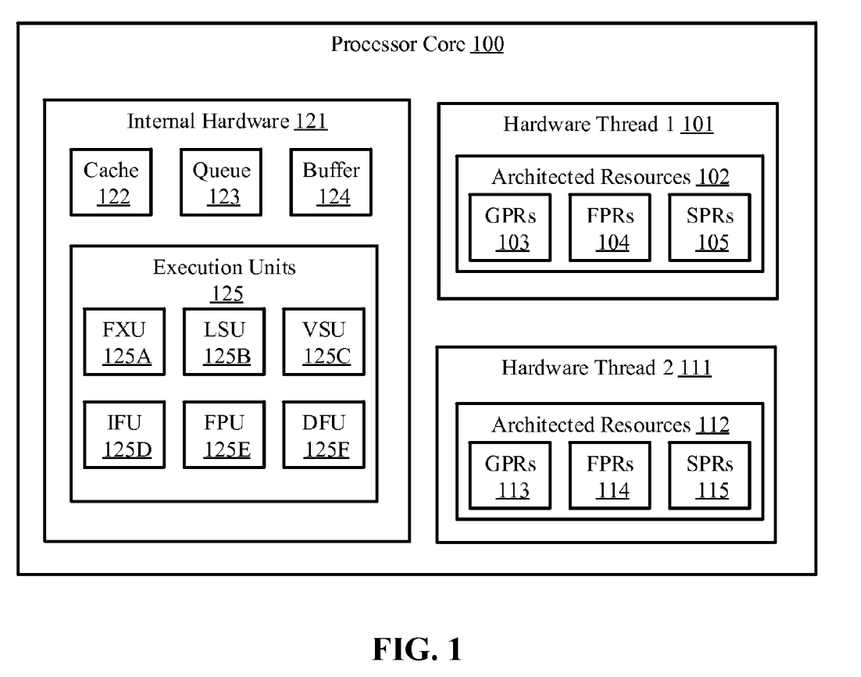
FIG. 1 illustrates a block diagram of a processor core that supports simultaneous multithreading (SMT) with two hardware threads, in accordance with embodiments of the present disclosure.

Turning now to the figures, FIG. 1 illustrates a block diagram of a processor core 100 that supports simultaneous multithreading (SMT) with two hardware threads, in accordance with embodiments of the present disclosure. In some embodiments, the processor core 100 may be part of a multi-core central processing unit (CPU). In other embodiments, the processor core 100 may be part of a single core CPU.

The processor core 100 may include internal hardware 121 (also referred to as micro-architecture resources) and two hardware threads 101 and 111. The internal hardware 121 may include execution units 125. The execution units 125 may include one or more fixed-point units (FXU) 125A, load-store units (LSU) 125B, vector/scalar unit (VSU) 125C, instruction fetch units (IFU) 125D, floating point units (FPU) 125E, and decimal floating units (DFU) 125F. In some embodiments, the processor core 100 may include other execution units, such as cryptographic units, condition register units, and/or branch register units, among others.

The internal hardware 121 may also include, e.g., one or more caches 122, issue queues 123, buffers 124, and/or branch prediction units (not shown). The caches 122 may be a multi-level hierarchical caches. For example, each core in a processor (e.g., processor core 100) may have its own L1 cache. The L1 cache may be shared by all hardware threads (e.g., the first hardware thread 101 and the second hardware thread 111) within the processor core. The cores may also have access to L2 and L3 caches, which may be shared with other processor cores.

The hardware threads 101 and 111 may each have their own set of architected resources 102 and 112, respectively. The architected resources 102 and 112 may include one or more registers that are dedicated to a specific hardware thread. For example, the architected resources 102 and 112 may include one or more sets of general purpose registers (GPRs) 103 and 113, floating point registers (FPRs) 104 and 114, and special purpose registers (SPRs) 105 and 115. In some embodiments, the FPRs 104 and 114 may support storing floating point vectors. In these embodiments, the FPRs 104 and 114 may be vector/scalar registers (VSRs).

Because the processor core 100 supports SMT with two hardware threads, it may be referred to as supporting SMT-2 or being an SMT-2 processor core. While the processor core 100 illustrated in FIG. 1 is an SMT-2 processor core, other types of processor cores otherwise consistent with the present disclosure are contemplated. For example, in some embodiments an SMT-4 (four hardware threads per core) or SMT-8 (eight hardware threads per core) processor may be used in implementing one or more of the methods disclosed herein.

Figure 2:
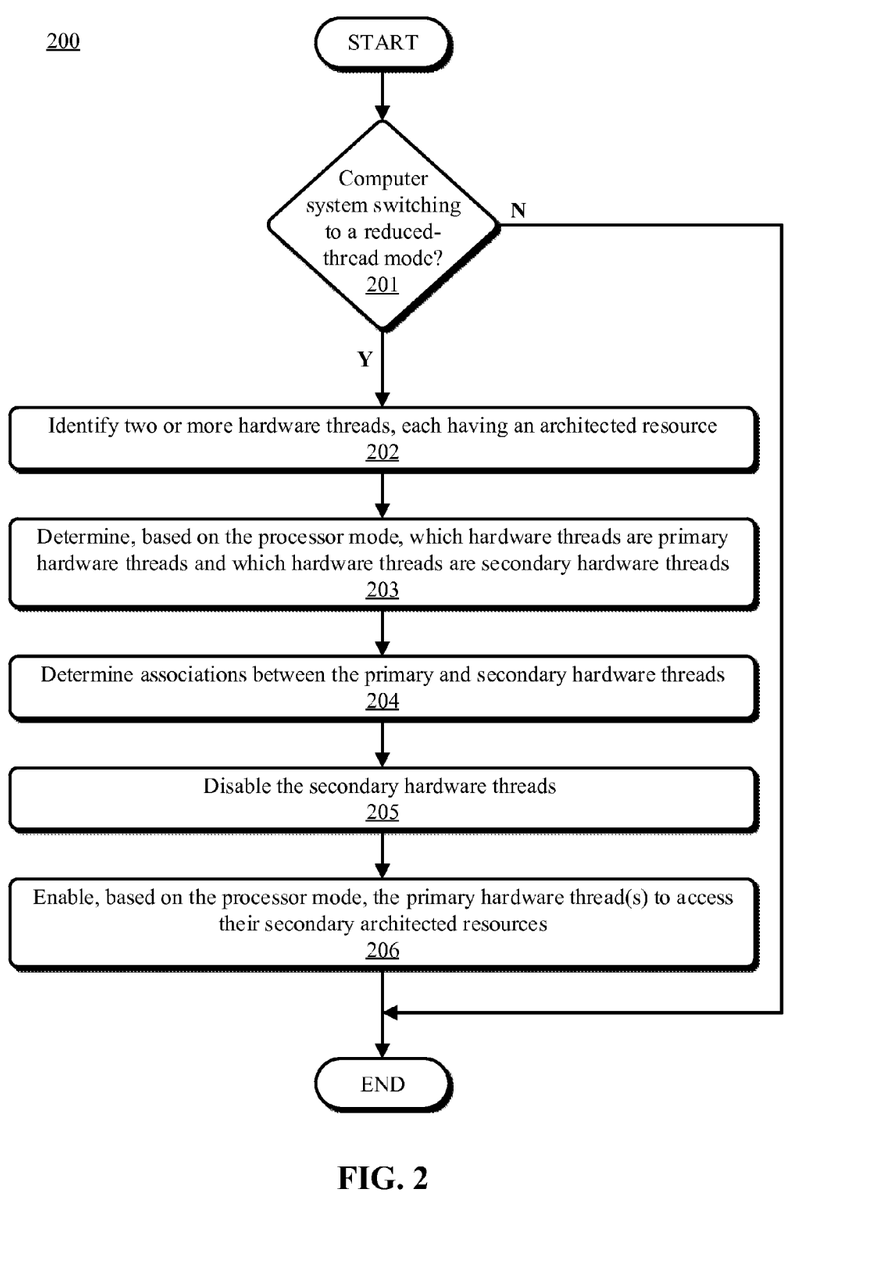
FIG. 2 illustrates a flowchart of a method for enabling SMT resource sharing of architected resources in a reduced-thread mode, in accordance with embodiments of the present disclosure.

Referring now to FIG. 2, shown is a flowchart of a method 200 for enabling SMT resource sharing of architected resources in a reduced-thread mode, in accordance with embodiments of the present disclosure. The method 200 may be performed by a computer system, such as the computer system in which the SMT processor resides. The method 200 may begin at decision block 201, where the computer system may determine whether an SMT processor is switching to a reduced-thread mode.

The processor may be in one of several different processor modes, as discussed herein. For example, the processor may be in its standard SMT mode (such as SMT-4 or SMT-8). The processor may alternatively be in a standard single-thread (ST) mode. In some embodiments, the processor may be in a reduced-thread mode, such as the extended-ST mode or the enhanced extended-ST mode. The computer system may determine which mode the processor is in by, e.g., checking a machine state register (MSR). The MSR may have one or more reserved bits for the processor mode. Other ways of determining what mode the processor is running in will be apparent to a person of ordinary skill and are contemplated by the present disclosure. If the computer system determines that the processor is not switching to a reduced-thread mode at decision block 201, the method 200 may end. If, however, the computer system determines that the processor is switching to a reduced-thread mode at decision block 201, the computer system may identify the two or more hardware threads at operation 202.

The number of threads identified may depend on the type of processor. For example, an SMT-2 processor has two hardware threads per core, while an SMT-4 processor has four hardware threads per core, and an SMT-8 processor has eight hardware threads per core. Each hardware thread may have a set of architected resources. The architected resources may include, e.g., one or more registers, such as those discussed in reference to FIG. 1. After identifying the two or more hardware threads at operation 202, the computer system may determine, based on the processor mode, which hardware threads are primary hardware threads and which are secondary hardware threads at operation 203.

Primary hardware threads are those hardware threads that may be active in the reduced-thread processor mode. Meanwhile, secondary hardware threads are those hardware threads that are not active in the reduced-thread processor mode and whose architected resources are assigned to another hardware thread. In the extended-ST mode, each primary hardware thread has a single associated secondary hardware thread. Accordingly, half of the hardware threads are primary hardware threads and half are secondary hardware threads. For example, an SMT-8 processor running in extended-ST mode will have four primary hardware threads per core and four secondary hardware threads per core, as discussed in more detail in reference to FIGS. 3A-3B.

In the enhanced extended-ST mode, each primary hardware thread may have multiple associated secondary hardware threads. Accordingly, fewer than half of the hardware threads may be primary hardware threads in the enhanced extended-ST mode. For example, an SMT-8 processor running in the enhanced extended-ST mode may have two primary hardware threads per core and six secondary hardware threads per core. Each of the two primary hardware threads may have three associated secondary hardware threads, as discussed in more detail in reference to FIGS. 4A-4B. As another example, an SMT-8 processor running in the enhanced extended-ST mode may have a single primary hardware thread per core and seven secondary hardware threads per core. The primary hardware thread may be associated with all seven secondary hardware threads.

In some embodiments, which hardware threads are primary hardware threads and which are secondary hardware threads may be set by default, depending on the processor mode. For example, by default the first third fifth and seventh hardware threads may be primary hardware threads in the extended-ST mode. Likewise, the second, fourth, sixth, and eighth hardware threads may be secondary hardware threads by default. In some embodiments, the default settings may be based on, e.g., the physical location of the hardware threads on the processor core.

In some embodiments, a user may be able to select which hardware threads are primary hardware threads and which are secondary hardware threads. The user may make the decision when configuring the processor to run in a reduced-thread mode. For example, an operating system (OS) option may allow a user to dynamically switch the processor from one mode to another. When switching the processor to a reduced-thread mode, the user may also be able to select which hardware threads should be primary hardware threads and which should be secondary hardware threads.

After determining which hardware threads are primary hardware threads and which are secondary hardware threads at operation 203, the computer system may determine which primary hardware threads are associated with which secondary hardware threads at operation 204. In some embodiments, there may be default associations between primary and secondary hardware threads for each mode. For example, the first and second hardware threads may be associated with each other in an SMT-8 processor core. Likewise, the third and fourth hardware threads may be associated with each other; the fifth and sixth hardware threads may be associated with each other; and the seventh and eighth hardware threads may be associated with each other.

In some embodiments, the default associations may be based on the physical location of the hardware threads (or their architected resources) on the processor core. For example, each primary hardware thread may be associated with a secondary hardware thread that is adjacent to it on the processor core.

In some embodiments, a user may be able to select the associations between primary hardware threads and secondary hardware threads. The user may make the decision when configuring the processor to run in the reduced-thread mode. When switching the processor to a reduced-thread mode using an operating system option, the user may be able to select which hardware threads should be primary hardware threads, as well as the associations between primary and secondary hardware threads. For example, a user may be able to select that the first hardware thread should be a primary hardware thread, and that it should be associated with a second hardware thread, which the user may decide to make a secondary hardware thread.

After determining associations between the primary and secondary hardware threads at operation 204, the computer system may disable the secondary hardware threads at operation 205. In some embodiments, the computer system may disable the secondary hardware threads by making them inaccessible, or invisible, to applications running on the computer system. For example, an application that is able to use multiple hardware threads may only recognize the primary hardware threads as existing. This may be done at one of several different software levels in the computer system. For example, the operating system may block applications running thereon from recognizing secondary hardware threads. In other embodiments, a hypervisor or BIOS may block applications from recognizing secondary hardware threads.

After disabling the secondary hardware threads at operation 205, the computer system may enable the primary hardware threads to access their secondary architected resources. The computer system may enable additional move instructions to allow applications running on a hardware thread to transfer data between primary and secondary architected resources.

In some embodiments, the computer system may allow applications running on the computer system to recognize the secondary resources as available registers. The application may be compiled using an application binary interface (ABI) specification that specifies how the application will be able to use the new move instructions to utilize the secondary architected resources.

For example, each hardware thread in a processor core may be provided with 32 GPRs, each GPR having 64 bits. Accordingly, in standard modes, the applications may recognize having 256 bytes (32*64 bits) of GPRs available to them. If the processor is set to run in extended-ST mode, the application may be able to recognize 512 bytes of available GPRs, the 256 byte primary GPRs and the 256 byte secondary GPRs. When the application needs to perform an operation on data stored in the secondary GPRs, it may use one of the move instructions disclosed herein to move the data to the primary GPRs. This may be done because the other instructions in the ISA may not allow the application executing on the primary hardware thread to perform operations directly on data stored in a secondary hardware thread's architected resources. The move instruction used may depend on the reduced-thread mode. For example, in the extended-ST mode, the move instruction may only specify the source and target registers. Meanwhile, the move instruction may additionally specify the thread ID of the secondary architected resource in the enhanced extended-ST, as discussed in more detail in reference to FIG. 4B. After moving the data to the primary GPRs, the application may perform the operation on the data.

After enabling the primary hardware threads to access their secondary architected resources at operation 206, the method 200 may end.

Figure 3A:
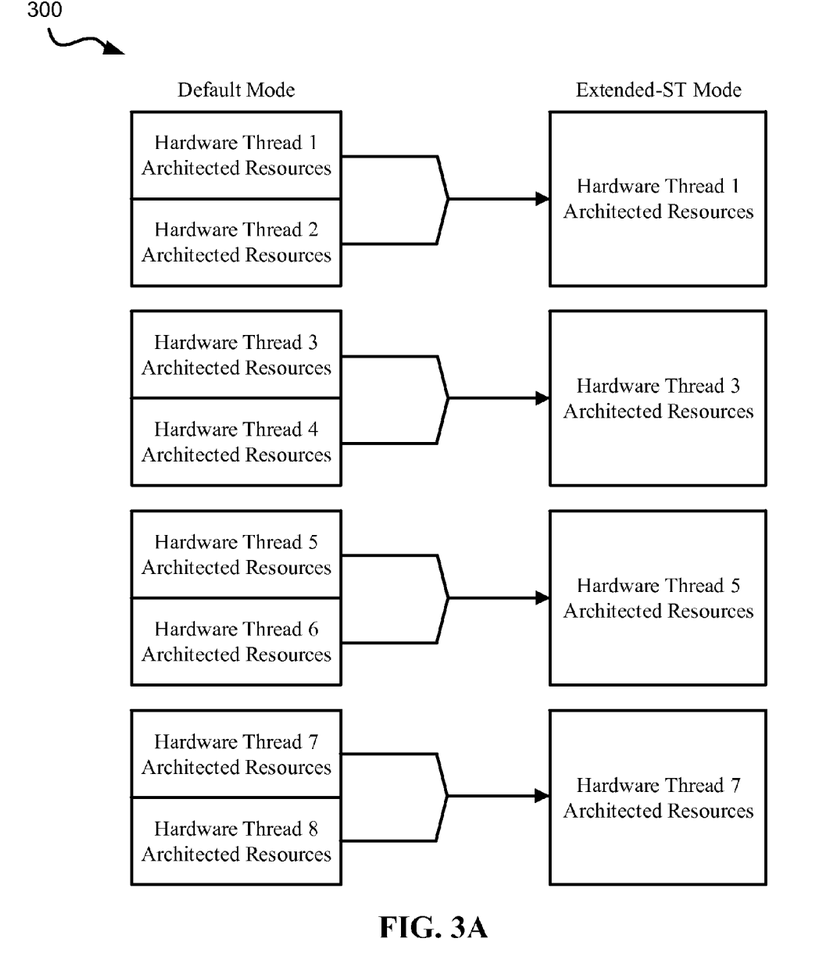
FIG. 3A illustrates an exemplary allocation of architected resources when a processor is switched from a default mode to an extended-ST mode, in accordance with embodiments of the present disclosure.

Referring now to FIG. 3A, shown is an exemplary allocation 300 of architected resources (e.g., registers) when a processor is switched from a default mode to an extended-ST mode, in accordance with embodiments of the present disclosure. The allocation 300 of architected resources shown in FIG. 3A is for an SMT-8 processor. In the default mode, eight hardware threads are active. Each hardware thread has its own set of architected resources.

When the processor is switched to the extended-ST mode, the processor may have four active hardware threads. Specifically, the first, third, fifth, and seventh hardware threads may be primary hardware threads and may remain active. The second, fourth, sixth, and eighth hardware threads may be secondary hardware threads and become inactive. Each primary hardware thread may then access two sets of architected resources: one set of primary architected resources and one set of secondary architected resources. For example, the first hardware thread may now have access to the second hardware thread's architected resources Likewise, the third hardware thread may now have access to the fourth hardware thread's architected resources, the fifth hardware thread may now have access to the sixth hardware thread's architected resources, and the seventh hardware thread may now have access to the eighth hardware thread's architected resources.

In some embodiments, some of the primary hardware threads may not be active. For example, the first hardware thread may remain active in the extended-ST mode, but the third, fifth, and seventh hardware threads may be inactive. In these embodiments, the secondary hardware threads may still be associated with the primary hardware threads (e.g., the third hardware thread may still be able, if activated, to access the fourth hardware thread's architected resources.

Figure 3B:
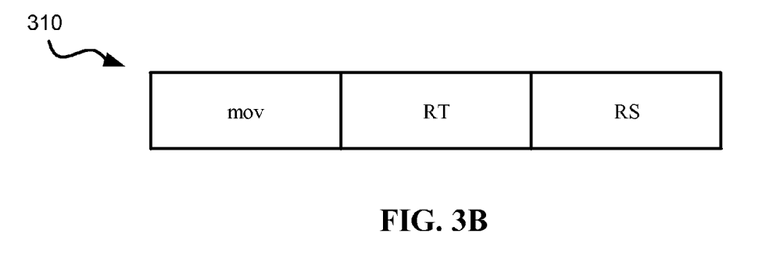
FIG. 3B illustrates a move instruction of an instruction set architecture (ISA) that may be used by a processor in an extended-ST mode to move data from a secondary architected resource to a primary architected resource, in accordance with embodiments of the present disclosure.

Referring now to FIG. 3B, shown is a move instruction of an instruction set architecture (ISA) that may be used by a processor in an extended-ST mode to move data from a secondary architected resource to a primary architected resource, in accordance with embodiments of the present disclosure. The move instruction 310 may be used by applications to copy data from a source register to a target register. For example, the move instruction 310 may be used by the first hardware thread to move data from a source register RS in the second hardware thread's architected resources to a target register RT in the first hardware thread's architected resources. Although the move instruction is shown as an R-format instruction, those skilled in the art will readily appreciate a variety of formats that may be used for the move instruction.

The move instruction 310 is shown as having the opcode "mov." The move instruction 310 may also specify the target (or destination) register RT and the source register RS.

Because the move instruction shown in FIG. 3B is only used in extended-ST mode, where each primary hardware thread has access to a single set of secondary architected resources, the move instruction does not specify a thread ID. The machine configuration (e.g., associations between primary hardware threads and secondary hardware threads) alone is enough to identify which secondary register set is being used by the thread.

Figure 4A:
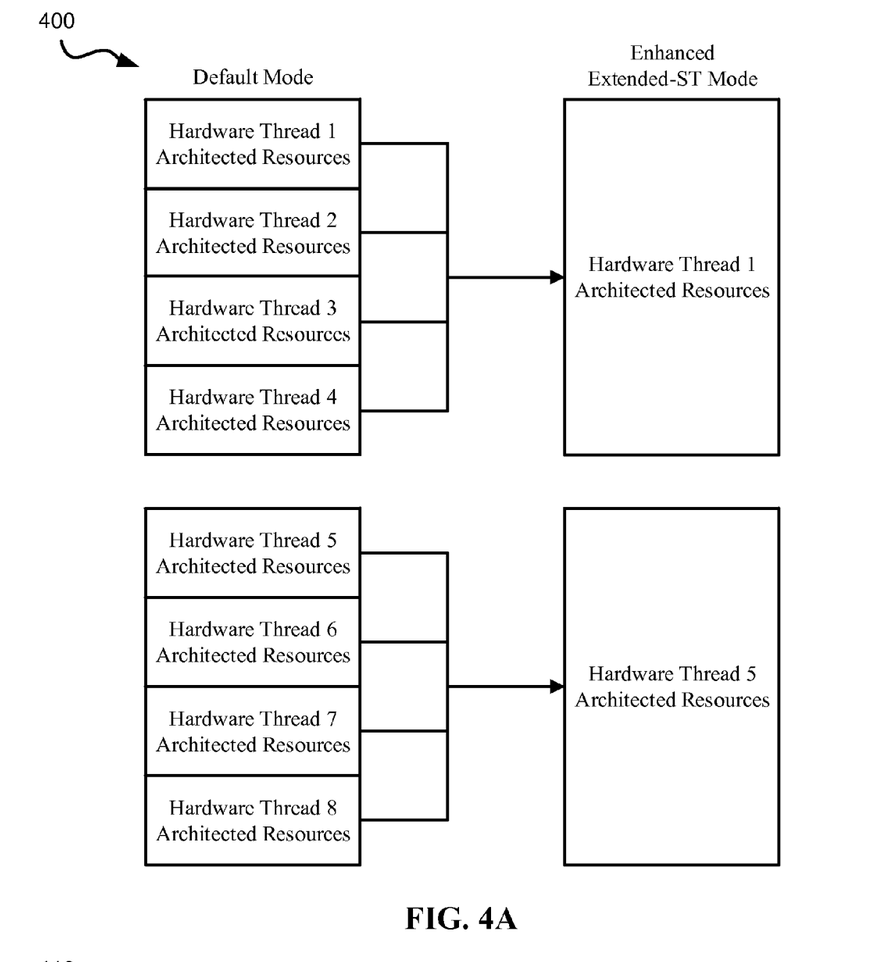
FIG. 4A illustrates an exemplary allocation of architected resources when a processor is switched from a default mode to an enhanced extended-ST mode, in accordance with embodiments of the present disclosure.

Referring now to FIG. 4A, shown is an exemplary allocation 400 of architected resources when a processor is switched from a default mode to an enhanced extended-ST mode, in accordance with embodiments of the present disclosure. The allocation 400 of architected resources shown in FIG. 4A is for an SMT-8 processor. In the default mode, eight hardware threads are active. Each hardware thread has its own set of architected resources.

When the processor is switched to the enhanced extended-ST mode, the processor may have two active hardware threads. Specifically, the first and fifth hardware threads may be primary hardware threads and may remain active. The second, third, fourth, sixth, seventh, and eighth hardware threads may be secondary hardware threads and become inactive. Each primary hardware thread may now access four sets of architected resources, one set of primary architected resources, and three sets of secondary architected resources. For example, the first hardware thread may now have access to the second, third, and fourth hardware threads' architected resources. Likewise, the fifth hardware thread may now have access to the sixth, seventh, and eighth hardware threads' architected resources.

In some embodiments, an SMT-8 processor core (such as the one shown in FIG. 4A) may have one primary hardware thread and seven secondary hardware threads in the enhanced extended-ST mode. As such, a single thread may have access to eight sets of architected resources.

Figure 4B:
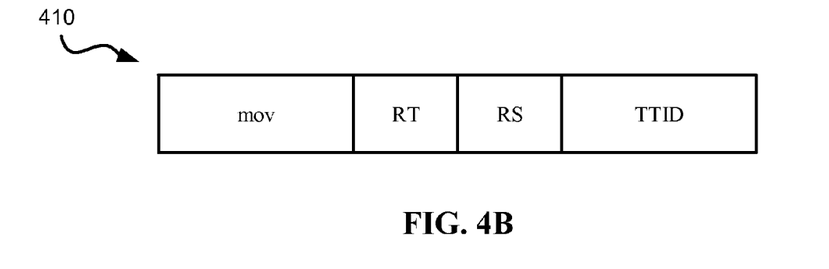
FIG. 4B illustrates a move instruction of an ISA that may be used by a processor in an enhanced extended-ST mode to move data from a secondary architected resource to a primary architected resource, in accordance with embodiments of the present disclosure.

Referring now to FIG. 4B, shown is a move instruction 410 of an ISA that may be used by a processor in an enhanced extended-ST mode to move data from a secondary architected resource to a primary architected resource, in accordance with embodiments of the present disclosure. The move instruction 410 may be used by applications to copy data from a source register RS to a target register RT. For example, the move instruction 410 may be used by the first hardware thread to move data from a source register RS in the second hardware thread's architected resources to a target register RT in the first hardware thread's architected resources. Although the move instruction 410 is shown as an R-format instruction, those skilled in the art will readily appreciate that a variety of formats may be used for the move instruction.

The move instruction is shown as having the opcode "mov." The move instruction may also specify the target (or destination) register RT and the source register RS. Because the move instruction shown in FIG. 4B is used in enhanced extended-ST mode, where each primary hardware thread has access to more than one set of secondary architected resources, the move instruction specifies a thread ID TTID. The machine configuration (e.g., associations between primary hardware threads and secondary hardware threads) alone is not enough to identify which secondary register set is being used by the thread.

The thread ID TTID may identify which secondary architected resource is being accessed by the primary hardware thread. In some embodiments, the thread ID TTID may identify the secondary architected resources by their hardware thread number. For example, the second hardware thread may have a hardware thread number of 1 (the first hardware thread having the number 0). In some embodiments, secondary architected resources may be renumbered when they are assigned to a primary hardware thread. For example, the second, third, and fourth hardware threads' architected resources might be renumbered to 0, 1, and 2, respectively, when they are assigned to the primary hardware thread (e.g., the first hardware thread). The examples given herein for assigning thread IDs are shown for illustrative purposes only. Any method for assigning thread IDs to hardware threads that is otherwise consistent with the present disclosure is contemplated.

Figure 5:
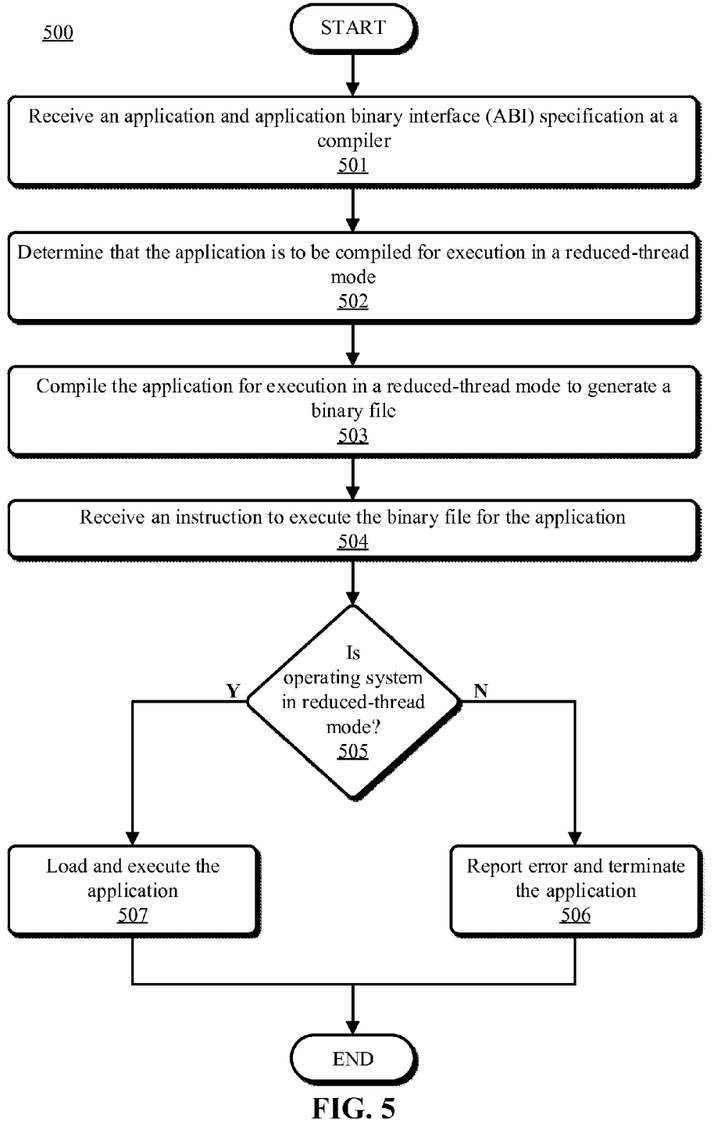
FIG. 5 illustrates a flowchart of a method for compiling and executing an application in a reduced-thread mode, in accordance with embodiments of the present disclosure.

Referring now to FIG. 5, shown is a flowchart of a method 500 for compiling and executing an application in a reduced-thread mode, in accordance with embodiments of the present disclosure. The method 500 may be performed by a computer system. The method 500 may begin at operation 501, where a compiler may receive an application to be compiled and an application binary interface (ABI) specification.

The ABI specification may define how the compiler, and programmers, can use the secondary architected resources. For example, the ABI specification may define how the compiler utilizes the move instructions introduced herein to move data across sets of architected resources when the processor is running in different processor modes.

After receiving the application and ABI specification at operation 501, the computer system may determine that the application is set to be compiled for execution in a reduced-thread processor mode at operation 502. The computer system may check for a compiler flag to determine whether the application is supposed to be executed in a reduced-thread mode. The compiler flag may be found in memory or in a register. For example, the machine state register (MSR) may have a reserved bit indicating that applications are to be compiled for execution in a reduced-thread mode. In some embodiments, the application itself may contain a flag or command that instructs the compiler to compile it for execution in a reduced-thread mode.

In some embodiments, the application may be compiled differently in extended-ST mode than it is in enhanced extended-ST mode. Accordingly, the compiler may determine which reduced-thread mode the application is to be compiled for. For example, the application may contain a flag or command that instructs the compiler to compile for a specific reduced-thread mode (e.g., extended-ST mode).

After determining that the application is to be compiled for execution in a reduced-thread mode at operation 502, the computer system may compile the application at operation 503. The compiler may generate a binary file adhering to the ABI specification for the application and processor mode. After compiling the application and generating a binary file at operation 503, the computer system may receive an instruction to execute the binary file for the application at operation 504. In some embodiments, the instruction to execute the binary file may come from a user of the computer system. For example, a user may select the application for execution. In some embodiments, the instruction to execute the binary file may come from another application (e.g., a second application may call on the compiled application).

After receiving an instruction to execute the binary file at operation 504, the computer system may determine whether the operating system in a reduced-thread mode at decision block 505. The computer system may determine the mode of the operating system (and, therefore, the processor) by checking one or more reserved bits in the MSR. If the computer system determines that the operating system is in a reduced-thread mode at decision block 505, the computer system may load and execute the application at operation 507 and the method 500 may end.

If the computer system determines that the operating system is not in a reduced-thread mode at decision block 505, the computer system may report an error and terminate the application at operation 506 and the method 500 may end. The computer system may report the error by displaying an error message to the user.

In some embodiments, the computer system may dynamically switch the operating system to the appropriate mode instead of notifying the user attempting to execute the application of the error and terminating the application. The computer system may save the architected resource values (also referred to as the processor context) for the secondary architected resources into memory in order to save application state of the secondary hardware threads. The computer system may then load and execute the application. If the computer system is dynamically switched back to a different mode, the computer system may restore the values that were saved in memory back to the secondary architected resources in order to reactivate the secondary hardware threads.

In some embodiments, the computer system may prompt a user of the error. The computer system may then provide the user with a choice of terminating the application or switching the operating system to a reduced-thread mode that is compatible with the application's binary file. In response to the user selecting to switch the operating system to a reduced-thread mode, the computer system may switch to the reduced-thread mode and load and execute the application. Otherwise, the computer system may terminate the application.

In some embodiments, the computer system may determine which reduced-thread mode the operating system is in. The computer system may then compare the operating system's mode to the specific reduced-thread mode that the application was compiled to be run in. If the application was compiled to run in the same reduced-thread mode that the operating system is in, the computer system may load and execution the application. If the operating system is in a different reduced-thread mode than the application was compiled for, the computer system may report an error and terminate the application. In some embodiments, if the operating system is in a different reduced-thread mode, the computer system may dynamically switch the operating system to the specific reduced-thread mode that the application was compiled to run in. In some embodiments, the computer system may provide the user with a choice of terminating the application or switching the operating system to the correct reduced-thread mode.

Figure 6:
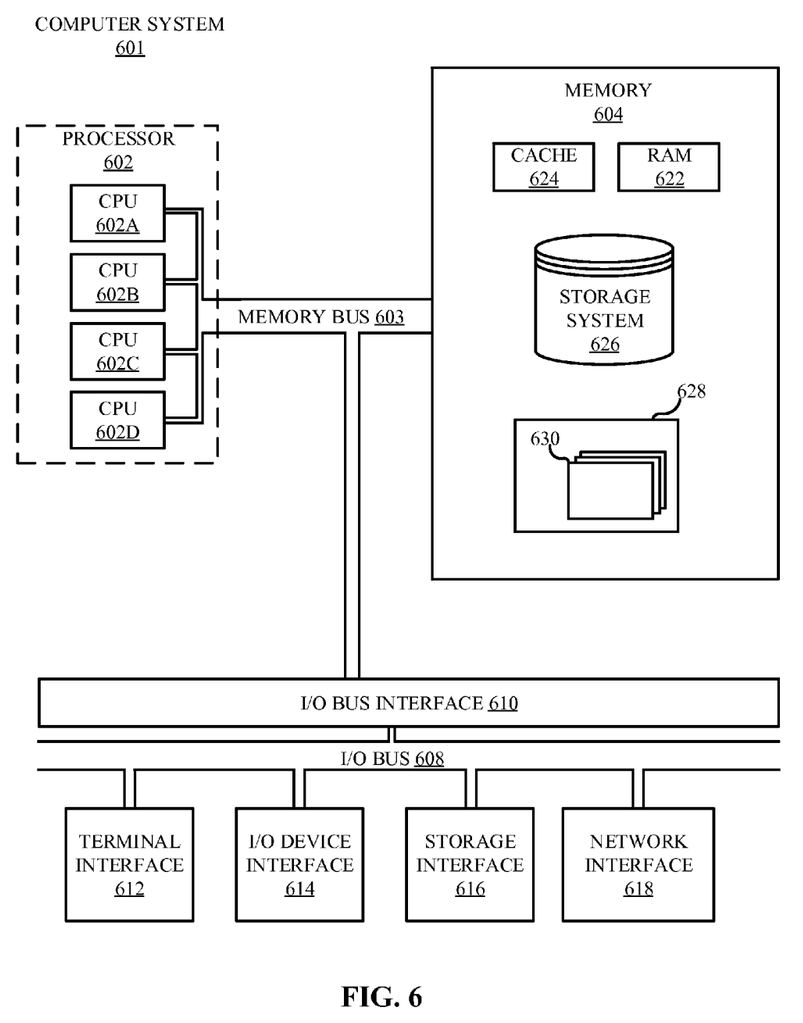
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for loading an application in a reduced-thread mode, the method comprising:
   receiving, by a compiler, an application and an application binary interface (ABI) specification;
   determining that the application is to be compiled for execution by a processor in a reduced-thread mode;
   generating a binary by compiling the application according to the ABI specification, the generated binary being configured to be run by the processor in the reduced-thread mode, the processor supporting simultaneous multithreading (SMT), the processor having a first hardware thread with a first architected resource and a second hardware thread with a second architected resource, the first hardware thread being a primary hardware thread and the second hardware thread being a secondary hardware thread, the second hardware thread being associated with the first hardware thread such that the first hardware thread can access the second architected resource;
   identifying, by an operating system, that the application is to be loaded;
   determining whether the operating system is in the reduced-thread mode; and
   loading, in response to determining that the operating system is in the reduced-thread mode, the application.

2. The method of claim 1, the method further comprising:
   reporting, in response to determining that the operating system is not in the reduced-thread mode, an error to a user attempting to load the application; and
   terminating the application.

3. The method of claim 1, the method further comprising:
   switching, in response to determining that the operating system is not in the reduced-thread mode, the operating system mode to the reduced-thread mode.

4. The method of claim 3, wherein the switching the operating system mode to the reduced-thread mode comprises:
   notifying a user that the application is configured to run in the reduced-thread mode;
   prompting the user to select an operating system mode; and
   receiving, from the user, a selected operating system mode, the selected operating system mode being the reduced-thread mode.

5. The method of claim 1, wherein the determining whether the operating system is in the reduced-thread mode comprises checking a machine state register.

6. The method of claim 1, wherein the determining that the application is to be compiled for execution by a processor in the reduced-thread mode comprises determining that a reduced-thread mode compiler flag is set.

7. The method of claim 1, wherein the ABI specification identifies how the compiler utilizes a move instruction when the processor is in the reduced-thread mode, the move instruction causing the processor to move data between a second architected resource and a first architected resource.

8. A system comprising:
   a memory;
   a processor in communication with the memory, the processor supporting simultaneous multithreading (SMT), the processor having a first hardware thread with a first architected resource and a second hardware thread with a second architected resource, the first hardware thread being a primary hardware thread and the second hardware thread being a secondary hardware thread, the second hardware thread being associated with the first hardware thread such that the first hardware thread can access the second architected resource; the processor being configured to perform a method comprising:
receiving, by a compiler, an application and an application binary interface (ABI) specification;
determining that the application is to be compiled for execution by the processor in a reduced-thread mode;
generating a binary by compiling the application according to the ABI specification, the generated binary being configured to be run by the processor in the reduced-thread mode;
identifying, by an operating system, that the application is to be loaded
determining whether the operating system is in the reduced-thread mode; and
loading, in response to determining that the operating system is in the reduced-thread mode, the application.

9. The system of claim 8, wherein the method performed by the processor further comprises:
reporting, in response to determining that the operating system is not in the reduced-thread mode, an error to a user attempting to load the application; and
terminating the application.

10. The system of claim 8, wherein the method performed by the processor further comprises:
switching, in response to determining that the operating system is not in the reduced-thread mode, the operating system mode to the reduced-thread mode.

11. The system of claim 10, wherein the switching the operating system mode to the reduced-thread mode comprises:
notifying a user that the application is configured to run in the reduced-thread mode;
prompting the user to select an operating system mode; and
receiving, from the user, a selected operating system mode, the selected operating system mode being the reduced-thread mode.

12. The system of claim 8, wherein the determining whether the operating system is in the reduced-thread mode comprises checking a machine state register.

13. The system of claim 8, wherein the determining that the application is to be compiled for execution by the processor in the reduced-thread mode comprises determining that a reduced-thread mode compiler flag is set.

14. The system of claim 8, wherein the ABI specification identifies how the compiler utilizes a move instruction when the processor is in the reduced-thread mode, the move instruction causing the processor to move data between the second architected resource and the first architected resource.

15. A computer program product comprising a computer readable storage medium having program instructions embodied therewith, the program instructions executable by a processor to cause the processor to perform a method comprising:
receiving, by a compiler, an application and an application binary interface (ABI) specification;
determining that the application is to be compiled for execution by a processor in a reduced-thread mode;
generating a binary by compiling the application according to the ABI specification, the generated binary being configured to be run by the processor in the reduced-thread mode, the processor supporting simultaneous multithreading (SMT), the processor having a first hardware thread with a first architected resource and a second hardware thread with a second architected resource, the first hardware thread being a primary hardware thread and the second hardware thread being a secondary hardware thread, the second hardware thread being associated with the first hardware thread such that the first hardware thread can access the second architected resource;
identifying, by an operating system, that the application is to be loaded
determining whether the operating system is in the reduced-thread mode; and
loading, in response to determining that the operating system is in the reduced-thread mode, the application.

16. The computer program product of claim 15, wherein the method performed by the processor further comprises:
reporting, in response to determining that the operating system is not in the reduced-thread mode, an error to a user attempting to load the application; and
terminating the application.

17. The computer program product of claim 15, wherein the method performed by the processor further comprises:
switching, in response to determining that the operating system is not in the reduced-thread mode, the operating system mode to the reduced-thread mode.

18. The computer program product of claim 17, wherein the switching the operating system mode to the reduced-thread mode comprises:
notifying a user that the application is configured to run in the reduced-thread mode;
prompting the user to select an operating system mode; and
receiving, from the user, a selected operating system mode, the selected operating system mode being the reduced-thread mode.

19. The computer program product of claim 15, wherein the determining whether the operating system is in the reduced-thread mode comprises checking a machine state register.

20. The computer program product of claim 15, wherein the determining that the application is to be compiled for execution by the processor in the reduced-thread mode comprises determining that a reduced-thread mode compiler flag is set.

* * * * *